United States Patent
Yuan et al.

(10) Patent No.: US 12,100,113 B2
(45) Date of Patent: Sep. 24, 2024

(54) PERFORMING OCCLUSION-AWARE GLOBAL 3D POSE AND SHAPE ESTIMATION OF ARTICULATED OBJECTS

(71) Applicant: NVIDIA Corporation, Santa Clara, CA (US)

(72) Inventors: Ye Yuan, Pittsburgh, PA (US); Umar Iqbal, San Jose, CA (US); Pavlo Molchanov, San Jose, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 368 days.

(21) Appl. No.: 17/584,213

(22) Filed: Jan. 25, 2022

(65) Prior Publication Data

US 2023/0070514 A1    Mar. 9, 2023

Related U.S. Application Data

(60) Provisional application No. 63/238,696, filed on Aug. 30, 2021.

(51) Int. Cl.
*G06T 19/20* (2011.01)
*G06T 7/00* (2017.01)
*G06T 7/20* (2017.01)

(52) U.S. Cl.
CPC ............ *G06T 19/20* (2013.01); *G06T 7/0002* (2013.01); *G06T 7/20* (2013.01); *G06T 2207/10016* (2013.01); *G06T 2207/20084* (2013.01); *G06T 2207/30241* (2013.01); *G06T 2219/2016* (2013.01)

(58) Field of Classification Search
None
See application file for complete search history.

(56) References Cited

U.S. PATENT DOCUMENTS

| 10,198,624 B2 * | 2/2019 | Li | G06T 7/143 |
| 2019/0130583 A1 * | 5/2019 | Chen | G06T 7/194 |
| 2020/0298080 A1 * | 9/2020 | Zhang | G06N 3/045 |
| 2021/0090279 A1 * | 3/2021 | Dekel | G06T 7/215 |

(Continued)

OTHER PUBLICATIONS

Kaufmann et al., "Convolutional Autoencoders for Human Motion Infilling," 2020 International Conference on 3D Vision (3DV), Nov. 25-28, 2020 (Year: 2020).*

(Continued)

*Primary Examiner* — Soo Shin
(74) *Attorney, Agent, or Firm* — Zilka-Kotab, P.C.

(57) ABSTRACT

In order to determine accurate three-dimensional (3D) models for objects within a video, the objects are first identified and tracked within the video, and a pose and shape are estimated for these tracked objects. A translation and global orientation are removed from the tracked objects to determine local motion for the objects, and motion infilling is performed to fill in any missing portions for the object within the video. A global trajectory is then determined for the objects within the video, and the infilled motion and global trajectory are then used to determine infilled global motion for the object within the video. This enables the accurate depiction of each object as a 3D pose sequence for that model that accounts for occlusions and global factors within the video.

19 Claims, 8 Drawing Sheets

(56) References Cited

U.S. PATENT DOCUMENTS

2021/0097266 A1* 4/2021 Mangalam .............. G06N 3/045
2021/0142497 A1* 5/2021 Pugh ........................ G06T 7/194

OTHER PUBLICATIONS

Zhang et al., "Learning Motion Priors for 4D Human Body Capture in 3D Scenes," arXiv:2108. 10399, Aug. 23, 2021 (Year: 2021).*
Ghiasi, Golnaz, "Recognizing and Segmenting Objects in the Presence of Occlusion and Clutter," UC Irvine PhD Dissertation, 2016 (Year: 2016).*
Gopinathan et al., "Indoor Semantic Scene Understanding using Multi-modality Fusion," arXiv:2108.07616v1 [cs.CV] Aug. 17, 2021 ( Year: 2021).*
Zanfir et al., "THUNDR: Transformer-based 3D HUmaN Reconstruction with Markers," ICCV, 2021, pp. 12971-12980.
Zhang et al., "PyMAF: 3D Human Pose and Shape Regression with Pyramidal Mesh Alignment Feedback Loop," CCV, 2021, pp. 11446-11456, retrieved from https://openaccess.thecvf.com/content/ICCV2021/papers/Zhang_PyMAF_3D_Human_Pose_and_Shape_Regression_With_Pyramidal_Mesh_ICCV_2021_paper.pdf.
Zhang et al., "Body Meshes as Points," CVPR, 2021, pp. 546-556.
Zhang et al., "Learning Motion Priors for 4D Human Body Capture in 3D Scenes," ICCV, 2021, pp. 11343-11353, retrieved from https://openaccess.thecvf.com/content/ICCV2021/papers/Zhang_Learning_Motion_Priors_for_4D_Human_Body_Capture_in_3D_ICCV_2021_paper.pdf.
Zhang et al., "Object-Occluded Human Shape and Pose Estimation from a Single Color Image," CVPR, 2020, pp. 7376-7385.
Zhang et al., "4D Association Graph for Realtime Multi-person Motion Capture Using Multiple Video Cameras," CVPR, 2020, pp. 1-10, retrieved from https://arxiv.org/abs/2002.12625.
Zhang et al., "Lightweight Multi-person Total Motion Capture Using Sparse Multi-view Cameras," ICCV, 2021, pp. 5560-5569, retrieved from https://openaccess.thecvf.com/content/ICCV2021/papers/Zhang_Lightweight_Multi-Person_Total_Motion_Capture_Using_Sparse_Multi-View_Cameras_ICCV_2021_paper.pdf.
Zheng et al., "DeepMultiCap: Performance Capture of Multiple Characters Using Sparse Multiview Cameras," arXiv, 2021, pp. 1-11, retrieved from https://arxiv.org/pdf/2105.00261.pdf.
Zhou et al., "Monocular Real-time Full Body Capture with Interpart Correlations," CVPR, 2021, pp. 4811-4822.
Kundu et al., "BiHMP-GAN: Bidirectional 3D Human Motion Prediction GAN," AAAI, 2019, 8 pages, retrieved from https://arxiv.org/abs/1812.02591.
Kundu et al., "Appearance Consensus Driven Self-Supervised Human Mesh Recovery," ECCV, 2020, 25 pages, retrieved from https://arxiv.org/abs/2008.01341.
Lassner et al., "Unite the People: Closing the Loop Between 3D and 2D Human Representations," CVPR, 2017, pp. 6050-6059, retrieved from https://openaccess.thecvf.com/content_cvpr_2017/papers/Lassner_Unite_the_People_CVPR_2017_paper.pdf.
Li et al., "HybrIK: A Hybrid Analytical-Neural Inverse Kinematics Solution for 3D Human Pose and Shape Estimation," CVPR, 2021, 14 pages, retrieved from https://arxiv.org/abs/2011.14672.
Li et al., "Learning to Generate Diverse Dance Motions with Transformer," arXiv, 2020, 9 pages, retrieved from https://arxiv.org/pdf/2008.08171.pdf.
Li et al., "AI Choreographer: Music Conditioned 3D Dance Generation with AIST++," ICCV, 2021, pp. 13401-13412.
Zhou et al., "Auto-Conditioned Recurrent Networks for Extended Complex Human Motion Synthesis," ICLR, 2018, 13 pages.
Lin et al., "End-to-End Human Pose and Mesh Reconstruction with Transformers," CVPR, 2021, pp. 1954-1963, retrieved from https://openaccess.thecvf.com/content/CVPR2021/papers/Lin_End-to-End_Human_Pose_and_Mesh_Reconstruction_with_Transformers_CVPR_2021_paper.pdf.
Liu et al., "4D Human Body Capture from Egocentric Video via 3D Scene Grounding," International Conference on 3D Vision (3DV), 2021, 10 pages, retrieved from https://www.semanticscholar.org/paper/4D-Human-Body-Capture-from-Egocentric-Video-via-3D-Liu-Yang/14753b5266f5607d145166c37cdea037c62f2f48.
Loper et al., "SMPL: A Skinned Multi-Person Linear Model," ACM Transactions on Graphics, vol. 34, Nov. 2015, 16 pages, retrieved from https://www.researchgate.net/publication/287815055_SMPL_a_skinned_multi-person_linear_model.
Martinez et al., "On human motion prediction using recurrent neural networks," CVPR, 2017, pp. 2891-2900, retrieved from https://openaccess.thecvf.com/content_cvpr_2017/papers/Martinez_On_Human_Motion_CVPR_2017_paper.pdf.
Mehta et al., "Monocular 3D Human Pose Estimation in the Wild Using Improved CNN Supervision," International Conference on 3D Vision, 2017, 16 pages, retrieved from https://vcai.mpi-inf.mpg.de/3dhp-dataset/.
Mehta et al., "XNect: Real-time Multi-Person 3D Motion Capture with a Single RGB Camera," ACM Transactions on Graphics, vol. 39, No. 4, Jul. 2020, pp. 82:1-82:17.
Mehta et al., "VNect: Real-time 3D Human Pose Estimation with a Single RGB Camera." ACM Transactions on Graphics, vol. 36, No. 4, Jul. 2017, pp. 44:2-44:14.
Muller et al., "On Self-Contact and Human Pose," CVPR, 2021, pp. 9990-9999, retrieved from https://openaccess.thecvf.com/content/CVPR2021/papers/Muller_On_Self-Contact_and_Human_Pose_CVPR_2021_paper.pdf.
GitHub, "OpenSfM," GitHub, 2022, 3 pages, retrieved from https://github.com/mapillary/OpenSfM.
Pavlakos et al., "Expressive Body Capture: 3D Hands, Face, and Body from a Single Image," CVPR, 2019, pp. 10975-10985.
Pavlakos et al., "TexturePose: Supervising Human Mesh Estimation with Texture Consistency," ICCV, 2019, pp. 803-812, retrieved from https://openaccess.thecvf.com/content_ICCV_2019/papers/Pavlakos_TexturePose_Supervising_Human_Mesh_Estimation_With_Texture_Consistency_ICCV_2019_paper.pdf.
Pavlakos et al., "Learning to Estimate 3D Human Pose and Shape from a Single Color Image," CVPR, 2018, pp. 459-468, retrieved from https://openaccess.thecvf.com/content_cvpr_2018/papers/Pavlakos_Learning_to_Estimate_CVPR_2018_paper.pdf.
Pavllo et al., "QuaterNet: A Quaternion-based Recurrent Model for Human Motion," British Machine Vision Conference (BMVC), 2018, pp. 1-14, retrieved from https://arxiv.org/abs/1805.06485.
Payer et al., "Simultaneous Multi-Person Detection and Single-Person Pose Estimation With a Single Heatmap Regression Network," ICCV Pose Track Workshop, 2017, 4 pages, retrieved from https://www.tugraz.at/fileadmin/user_upload/Institute/ICG/Images/team_bischof/mib/paper_pdfs/2017PayerPosetrack.pdf.
Petrovich et al., "Action-Conditioned 3D Human Motion Synthesis with Transformer VAE," ICCV, 2021, pp. 1-14, retrieved from https://arxiv.org/abs/2104.05670v2.
Qiu et al., "Cross View Fusion for 3D Human Pose Estimation," ICCV, 2019, pp. 4342-4351, retrieved from https://openaccess.thecvf.com/content_ICCV_2019/papers/Qiu_Cross_View_Fusion_for_3D_Human_Pose_Estimation_ICCV_2019_paper.pdf.
Reddy et al., "TesseTrack: End-to-End Learnable Multi-Person Articulated 3D Pose Tracking," CVPR, 2021, pp. 15190-15200.
Rempe et al., "HuMoR: 3D Human Motion Model for Robust Pose Estimation," ICCV, 2021, 25 pages, retrieved from https://geometry.stanford.edu/projects/humor/.
Rockwell et al., "Full-Body Awareness from Partial Observations," ECCV, 2020, pp. 1-29, retrieved from https://arxiv.org/abs/2008.06046.
Rogez et al., "LCR-Net: Localization-Classification-Regression for Human Pose," CVPR, 2017, pp. 3433-3441, retrieved from https://openaccess.thecvf.com/content_cvpr_2017/papers/Rogez_LCR-Net_Localization-Classification-Regression_for_CVPR_2017_paper.pdf.
Rong et al., "Delving Deep Into Hybrid Annotations for 3D Human Recovery in the Wild," IEEE/CVF International Conference on Computer Vision (ICCV), 2019, 11 pages, retrieved from https://www.semanticscholar.org/paper/Delving-Deep-Into-Hybrid-Annotations-for-3D-Human-Rong-Liu/3feb365989bb4862f40bd1e8c5b70ce0829ed3cf.

(56) References Cited

OTHER PUBLICATIONS

Schonberger et al., "Structure-from-Motion Revisited," CVPR, 2016, pp. 4104-4113, retrieved from https://openaccess.thecvf.com/content_cvpr_2016/papers/Schonberger_Structure-From-Motion_Revisited_CVPR_2016_paper.pdf.

Schreiner et al., "Global Position Prediction for Interactive Motion Capture," Proceedings of the ACM on Computer Graphics and Interactive Techniques, vol. 4, No. 3, Sep. 2021, pp. 1-16.

Shimada et al., "PhysCap: Physically Plausible Monocular 3D Motion Capture in Real Time," ACM Transactions on Graphics, vol. 39, No. 6, Dec. 2020, pp. 235:1-235:16.

Song et al., "Human Body Model Fitting by Learned Gradient Descent," arXiv, 2020, 17 pages, retrieved from https://arxiv.org/pdf/2008.08474.pdf.

Sturm et al., "Towards a benchmark for RGB-D SLAM evaluation," Rgb-d workshop on advanced reasoning with depth cameras at robotics: Science and systems conf.(rss), Jan. 2011, 3 pages, retrieved from file:///C:/Users/Lleikam/Downloads/Towards_a_benchmark_for_RGB-D_SLAM_evaluation.pdf.

Sun et al., "Monocular, One-stage, Regression of Multiple 3D People," ICCV, 2021, pp. 11179-11188, retrieved from https://openaccess.thecvf.com/content/ICCV2021/papers/Sun_Monocular_One-Stage_Regression_of_Multiple_3D_People_ICCV_2021_paper.pdf.

Sun et al., "Human Mesh Recovery from Monocular Images via a Skeleton-disentangled Representation," ICCV, 2019, pp. 5349-5358, retrieved from https://openaccess.thecvf.com/content_ICCV_2019/papers/Sun_Human_Mesh_Recovery_From_Monocular_Images_via_a_Skeleton-Disentangled_Representation_ICCV_2019_paper.pdf.

Valle-Perez et al., "Transflower: probabilistic autoregressive dance generation with multimodal attention," ACM Transactions on Graphics, vol. 40, No. 6, Dec. 2021, pp. 1:1-1:13.

Vaswani et al., "Attention Is All You Need," 31st Conference on Neural Information Processing Systems (NIPS 2017), pp. 1-11.

Villegas et al., "Learning to Generate Long-term Future via Hierarchical Prediction," ICML, 2017, 10 pages, retrieved from https://web.eecs.umich.edu/~honglak/icml17_hierarchicalVideoPrediction.pdf.

Marcard et al. "Recovering Accurate 3D Human Pose in the Wild Using IMUs and a Moving Camera," ECCV, 2018, 17 pages.

Weng et al., "Holistic 3D Human and Scene Mesh Estimation from Single View Images," CVPR, 2021, pp. 334-343.

Xiang et al., "Monocular Total Capture: Posing Face, Body, and Hands in the Wild," CVPR, 2019, pp. 10965-10974, retrieved from https://openaccess.thecvf.com/content_CVPR_2019/papers/Xiang_Monocular_Total_Capture_Posing_Face_Body_and_Hands_in_the_CVPR_2019_paper.pdf.

Xie et al., "Physics-based Human Motion Estimation and Synthesis from Videos," ICCV, 2021, pp. 11532-11541, retrieved from https://openaccess.thecvf.com/content/ICCV2021/papers/Xie_Physics-Based_Human_Motion_Estimation_and_Synthesis_From_Videos_ICCV_2021_paper.pdf.

Xu et al., "DenseRaC: Joint 3D Pose and Shape Estimation by Dense Render- and-Compare," ICCV, 2019, pp. 7760-7770, retrieved from https://openaccess.thecvf.com/content_ICCV_2019/papers/Xu_DenseRaC_Joint_3D_Pose_and_Shape_Estimation_by_Dense_Render-and-Compare_ICCV_2019_paper.pdf.

Yan et al., "MT-VAE: Learning Motion Transformations to Generate Multimodal Human Dynamics," ECCV, 2018, 17 pages, retrieved from https://www.ecva.net/papers/eccv_2018/papers_ECCV/papers/Xinchen_Yan_Generating_Multimodal_Human_ECCV_2018_paper.pdf.

Yuan et al., "Diverse Trajectory Forecasting With Determinantal Point Processes," ICLR, 2020, pp. 1-15.

Yuan et al., "DLow: Diversifying Latent Flows for Diverse Human Motion Prediction," ECCV, 2020, pp. 1-19, retrieved from https://www.ecva.net/papers/eccv_2020/papers_ECCV/papers/123540324.pdf.

Yuan et al., "Residual Force Control for Agile Human Behavior Imitation and Extended Motion Synthesis," 34th Conference on Neural Information Processing Systems, 2020, pp. 1-12.

Yuan et al., "SimPoE: Simulated Character Control for 3D Human Pose Estimation," CVPR, 2021, pp. 1-13, retrieved from https://arxiv.org/abs/2104.00683.

Zanfir et al., "Weakly Supervised 3D Human Pose and Shape Reconstruction with Normalizing Flows, " ECCV, 2020, pp. 1-17, retrieved from https://www.ecva.net/papers/eccv_2020/papers_ECCV/papers/123510460.pdf.

Zanfir et al., "Deep Network for the Integrated 3D Sensing of Multiple People in Natural Images," 32nd Conference on Neural Information Processing Systems, 2018, pp. 1-10.

Kocabas et al., "VIBE: Video Inference for Human Body Pose and Shape Estimation," CVPR, 2020, 12 pages, retrived from https://arxiv.org/abs/1912.05656.

Moon et al., "12L-MeshNet: Image-to-Lixel Prediction Network for Accurate 3D Human Pose and Mesh Estimation from a Single RGB Image," ECCV, 2020, 16 pages, retrieved from https://www.ecva.net/papers/eccv_2020/papers_ECCV/papers/123520732.pdf.

Moon et al., "Camera Distance-aware Top-down Approach for 3D Multi-person Pose Estimation from a Single RGB Image," ICCV, 2019, pp. 10133-10142, retrieved from https://openaccess.thecvf.com/content_ICCV_2019/papers/Moon_Camera_Distance-Aware_Top-Down_Approach_for_3D_Multi-_Person_Pose_Estimation_From_ICCV_2019_paper.pdf.

Zhen et al., "SMAP: Single-Shot Multi-Person Absolute 3D Pose Estimation," ECCV, 2020, 20 pages, retrieved from https://arxiv.org/abs/2008.11469.

Iqbal et al., "Kama: 3D Keypoint Aware Body Mesh Articulation," International Conference on 3D Vision (3DV), Apr. 2021, 11 pages, retrieved from https://www.semanticscholar.org/paper/KAMA%3A-3D-Keypoint-Aware-Body-Mesh-Articulation-Iqbal-Xie/3627616a92134ba74600eb576718efe744c486f6.

Iqbal et al., "Weakly-Supervised 3D Human Pose Learning via Multi-view Images in the Wild," CVPR, 2020, pp. 5243-5252.

Fieraru et al., "Three-dimensional Reconstruction of Human Interactions," CVPR, 2020, pp. 7214-7223.

Mahmood et al., "AMASS: Archive of Motion Capture as Surface Shapes," IEEE/CVF International Conference on Computer Vision (ICCV), 2019, 12 pages, retrieved from https://www.semanticscholar.org/paper/AMASS%3A-Archive-of-Motion-Capture-As-Surface-Shapes-Mahmood-Ghorbani/690c817ab5be8017ff713fa1028669debde205af.

Zanfir et al., "Monocular 3D Pose and Shape Estimation of Multiple People in Natural Scenes, The Importance of Multiple Scene Constraints," CVPR, 2018, 10 pages, retrieved from https://openaccess.thecvf.com/content_cvpr_2018/CameraReady/2235.pdf.

Akhter et al., "Pose-Conditioned Joint Angle Limits for 3D Human Pose Reconstruction," CVPR, 2015, pp. 1446-1455.

Aksan et al., "Structured Prediction Helps 3D Human Motion Modelling," ICCV, 2019, 15 pages, retrieved from https://arxiv.org/abs/1910.09070.

Aliakbarian et al., "A Stochastic Conditioning Scheme for Diverse Human Motion Prediction," CVPR, 2020, pp. 5223-5232.

Barsoum et al., "HP-GAN: Probabilistic 3D human motion prediction via GAN," CVPR, 2018, pp. 1531-1540.

Belagiannis et al., "3D Pictorial Structures for Multiple Human Pose Estimation," CVPR, 2014, 8 pages, retrieved from http://campar.in.tum.de/pub/belagiannis2014cvpr/belagiannis2014cvpr.pdf.

Bogo et al., "Keep it SMPL: Automatic Estimation of 3D Human Pose and Shape from a Single Image," ECCV, 2016, 19 pages.

Huang et al., "Dynamic Multi-Person Mesh Recovery From Uncalibrated Multi-View Cameras," 3DV, 2021, 11 pages, retrieved from https://www.yangangwang.com/papers/HUANG-3DV-2021-10.pdf.

Choi et al., "Pose2Mesh: Graph Convolutional Network for 3D Human Pose and Mesh Recovery from a 2D Human Pose," ECCV, 2020, pp. 1-27, retieved from https://arxiv.org/abs/2008.09047.

Choi et al., "Beyond Static Features for Temporally Consistent 3D Human Pose and Shape from a Video," CVPR, 2021, 12 pages, retrieved from https://arxiv.org/abs/2011.08627.

(56) References Cited

OTHER PUBLICATIONS

Choutas et al., "Monocular Expressive Body Regression through Body-Driven Attention," ECCV, 2020, 45 pages, retrieved from https://arxiv.org/abs/2008.09062.

Dabral et al., "Gravity-Aware Monocular 3D Human-Object Reconstruction," ICCV, 2021, pp. 12365-12374.

Dong et al., "Fast and Robust Multi-Person 3D Pose Estimation from Multiple Views," CVPR, 2019, pp. 7792-7801.

Dong et al., "Motion Capture from Internet Videos," ECCV, 2020, 17 pages, retrieved from https://www.ecva.net/papers/eccv_2020/papers_ECCV/papers/123470205.pdf.

Dong et al., "Shape-aware Multi-Person Pose Estimation from Multi-View Images," ICCV, 2021, pp. 11158-11168.

Fabbri et al., "Compressed Volumetric Heatmaps for Multi-Person 3D Pose Estimation," CVPR, 2020, pp. 7204-7213.

Fragkiadaki et al., "Recurrent Network Models for Human Dynamics," ICCV, 2015, pp. 4346-4354, retrieved from https://www.cv-foundation.org/openaccess/content_iccv_2015/papers/Fragkiadaki_Recurrent_Network_Models_ICCV_2015_paper.pdf.

Gopalakrishnan et al., "A Neural Temporal Model for Human Motion Prediction," CVPR, 2019, pp. 12116-12125, retrieved from https://openaccess.thecvf.com/content_CVPR_2019/papers/Gopalakrishnan_A_Neural_Temporal_Model_for_Human_Motion_Prediction_CVPR_2019_paper.pdf.

Gopinath et al., "facebookresearch/fairmotion: Tools to load, process and visualize motion capture data," GitHub, 2021, 6 pages, retrieved from https://github.com/facebookresearch/fairmotion.

Guler et al., "HoloPose: Holistic 3D Human Reconstruction In-The-Wild," CVPR, 2019, pp. 10884-10894, retrieved from https://openaccess.thecvf.com/content_CVPR_2019/papers/Guler_HoloPose_Holistic_3D_Human_Reconstruction_In-The-Wild_CVPR_2019_paper.pdf.

Guzov et al., "Human POSEitioning System (HPS): 3D Human Pose Estimation and Self-localization in Large Scenes from Body-Mounted Sensors," CVPR, 2021, pp. 4318-4329.

Harvey et al., "Robust Motion In-betweening," ACM Transactions on Graphics, vol. 39, No. 4, Jul. 2020, pp. 60:1-60:12.

Hasler et al., "Markerless Motion Capture with Unsynchronized Moving Cameras," IEEE Conference on Computer Vision and Pattern Recognition, 2009, 8 pages, retrieved from https://www.semanticscholar.org/paper/Markerless-Motion-Capture-with-unsynchronized-Hasler-Rosenhahn/5c4d3c8a9da9add969dbd9def04c59c4d34518c0.

Yan et al., "RoNIN: Robust Neural Inertial Navigation in the Wild: Benchmark, Evaluations, and New Methods," IEEE International Conference on Robotics and Automation (ICRA), 2020, 14 pages, retrieved from https://www.semanticscholar.org/paper/RoNIN%3A-Robust-Neural-Inertial-Navigation-in-the-%26-Yan-Herath/07d8068d3adaa9bad155397910fef7f032c13fcd.

Hernandez Ruiz et al., "Human Motion Prediction via Spatio-Temporal Inpainting," IEEE/CVF International Conference on Computer Vision (ICCV), 2019, 10 pages, retrieved from https://www.semanticscholar.org/paper/Human-Motion-Prediction-via-Spatio-Temporal-Ruiz-Gall/1c6f7be372f913d40e058e26cc840456fd24f5a6.

Huang et al., Dance Revolution: Long-Term Dance Generation with Music via Curriculum Learning, ICLR, 2021, pp. 1-14.

Ionescu et al., "Human3.6M: Large Scale Datasets and Predictive Methods for 3D Human Sensing in Natural Environments," IEEE Transactions on Pattern Analysis and Machine Intelligence, 2014, pp. 1-15.

Isogawa et al., "Optical Non-Line-of-Sight Physics-based 3D Human Pose Estimation," CVPR, 2020, pp. 7013-7022.

Jain et al., "Structural-RNN: Deep Learning on Spatio-Temporal Graphs," CVPR, 2016, 10 pages, retrieved from https://cvgl.stanford.edu/papers/jain_cvpr16.pdf.

Jiang et al., "Coherent Reconstruction of Multiple Humans from a Single Image," CVPR, 2020, pp. 82-91.

Joo et al., "Exemplar Fine-Tuning for 3D Human Model Fitting Towards in-the-Wild 3D Human Pose Estimation," International Conference on 3D Vision (3DV), Apr. 2020, 21 pages, retrieved from https://www.semanticscholar.org/paper/Exemplar-Fine-Tuning-for-3D-Human-Model-Fitting-3D-Joo-Neverova/280bb394888624d64766558a46759f400e6d8403.

Joo et al., "Total Capture: A 3D Deformation Model for Tracking Faces, Hands, and Bodies," CVPR, 2018, pp. 8320-8329, retrieved from https://openaccess.thecvf.com/content_cvpr_2018/papers/Joo_Total_Capture_A_CVPR_2018_paper.pdf.

Kanazawa et al., "End-to-end Recovery of Human Shape and Pose," CVPR, 2018, pp. 7122-7131, retrieved from https://openaccess.thecvf.com/content_cvpr_2018/papers/Kanazawa_End-to-End_Recovery_of_CVPR_2018_paper.pdf.

Kanazawa et al., "Learning 3D Human Dynamics from Video," CVPR, 2019, pp. 5614-5623, retrieved from https://openaccess.thecvf.com/content_CVPR_2019/papers/Kanazawa_Learning_3D_Human_Dynamics_From_Video_CVPR_2019_paper.pdf.

Kaufmann et al., Convolutional Autoencoders for Human Motion Infilling, International Conference on 3D Vision (3DV), 2020, pp. 918-927.

Khurana et al., "Detecting Invisible People," ICCV, 2021, pp. 3174-3184, retrieved from https://openaccess.thecvf.com/content/ICCV2021/papers/Khurana_Detecting_Invisible_People_ICCV_2021_paper.pdf.

Kingma et al., "Auto-Encoding Variational Bayes," arXiv, 2014, 14 pages, retrieved from https://arxiv.org/abs/1312.6114v10.

Kocabas et al., "PARE: Part Attention Regressor for 3D Human Body Estimation," ICCV, 2021, pp. 11127-11137, retrieved from https://openaccess.thecvf.com/content/ICCV2021/papers/Kocabas_PARE_Part_Attention_Regressor_for_3D_Human_Body_Estimation_ICCV_2021_paper.pdf.

Kocabas et al., "SPEC: Seeing People in the Wild with an Estimated Camera," ICCV, 2021, pp. 11035-11045, retrieved from https://openaccess.thecvf.com/content/ICCV2021/papers/Kocabas_SPEC_Seeing_People_in_the_Wild_With_an_Estimated_Camera_ICCV_2021_paper.pdf.

Kolotouros et al., "Learning to Reconstruct 3D Human Pose and Shape via Model-fitting in the Loop," ICCV, 2019, pp. 2252-2261, retrieved from https://openaccess.thecvf.com/content_ICCV_2019/papers/Kolotouros_Learning_to_Reconstruct_3D_Human_Pose_and_Shape_via_Model-Fitting_ICCV_2019_paper.pdf.

Kolotouros et al., "Convolutional Mesh Regression for Single-Image Human Shape Reconstruction," CVPR, 2019, pp. 4501-4510, retrieved from https://openaccess.thecvf.com/content_CVPR_2019/papers/Kolotouros_Convolutional_Mesh_Regression_for_Single-Image_Human_Shape_Reconstruction_CVPR_2019_paper.pdf.

Kolotouros et al., "Probabilistic Modeling for Human Mesh Recovery," ICCV, 2021, pp. 11605-11614, retrieved from https://openaccess.thecvf.com/content/ICCV2021/papers/Kolotouros_Probabilistic_Modeling_for_Human_Mesh_Recovery_ICCV_2021_paper.pdf.

\* cited by examiner

PERFORMING OCCLUSION-AWARE GLOBAL 3D POSE AND SHAPE ESTIMATION OF ARTICULATED OBJECTS

FIELD OF THE INVENTION

The present invention relates to video analysis, and more particularly to determining accurate three-dimensional (3D) models from objects in a video.

BACKGROUND

Recovering fine-grained 3D human meshes from monocular videos is valuable for understanding human behaviors and interactions, which can be the cornerstone for numerous applications including virtual or augmented reality, assistive living, autonomous driving, etc. Many of these applications use dynamic cameras to capture human behaviors yet also require estimating human motions in global coordinates consistent with their surroundings. For instance, assistive robots and autonomous vehicles need a holistic understanding of human behaviors and interactions in the world to safely plan their actions even when they are moving. It is therefore desirable to recover global human meshes from monocular videos captured by dynamic cameras, while accounting for scale ambiguity and occlusions.

DETAILED DESCRIPTION

In order to determine accurate three-dimensional (3D) models for objects (such as articulated objects) within a video, the objects are first identified and tracked within the video, and a pose and shape are estimated for these tracked objects. A translation and global orientation are removed from the tracked objects to determine local motion for the objects, and motion infilling is performed to fill in any missing portions for the object within the video. A global trajectory is then determined for the objects within the video, and the infilled motion and global trajectory are then used to determine infilled global motion for the object within the video. This enables the accurate depiction of each object as a 3D pose sequence for that model that accounts for occlusions and global factors within the video.

Figure 1:
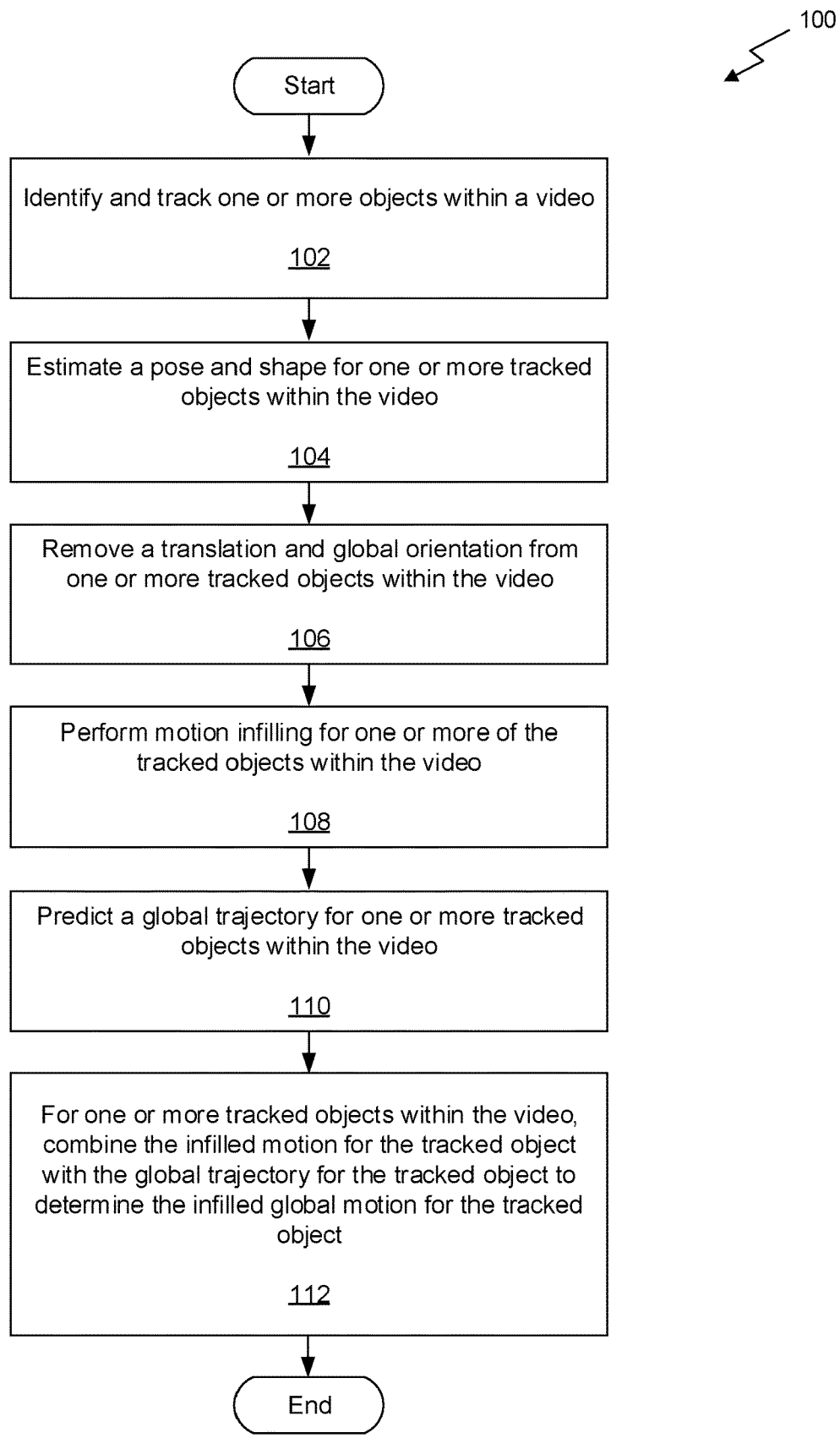
FIG. 1 illustrates a flowchart of a method for performing occlusion-aware global 3D pose estimation, in accordance with an embodiment.

FIG. 1 illustrates a flowchart of a method 100 for performing occlusion-aware global 3D pose estimation, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processing element. Furthermore, persons of ordinary skill in the art will understand that any system that performs method 100 is within the scope and spirit of embodiments of the present invention.

As shown in operation 102, one or more objects within a video are identified and tracked. In one embodiment, the video may include a monocular video (e.g., one or more video sources/perspectives of a single scene). In another embodiment, the video may include a plurality of video frames from one or more camera positions. In yet another embodiment, the video may be produced by one or more cameras within an automated driving/navigation system.

Additionally, in one embodiment, each object within the video may include any entity within the scene (e.g., a person, vehicle, animal, etc.). In another embodiment, a bounding box may be placed around one or more objects within each frame of the video. In yet another embodiment, an identifier may be assigned to one or more objects within the video. In still another embodiment, one or more of the objects may include articulated objects (e.g., objects having two or more sections connected by at least one flexible joint, etc.).

Further, in one embodiment, objects that are removed from the scene in one or more frames may be re-identified (with a previously-assigned identifier) and tracked (using a bounding box and/or its content) when they reappear within the scene. In another embodiment, the results of the identifying and tracking may include a video, where each frame of the video includes bounding boxes around each identified object, and an identifier for each object.

Further still, as shown in operation 104, a pose and shape are estimated for one or more tracked objects within the video. In one embodiment, for each frame within the video, a pose and shape of one or more identified and tracked objects within the frame may be determined. In another embodiment, within each frame of the video, a pose and shape of one or more objects within their respective bounding boxes may be determined.

Also, in one embodiment, the pose and shape may be determined for the tracked object for each frame of the video. This may result in a determination of global motion with respect to the camera for one or more objects within the video.

In addition, as shown in operation 106, a translation and global orientation are removed from one or more tracked objects within the video. In one embodiment, within each frame of the video, a translation and global orientation may be removed from one or more objects within each bounding box. In another embodiment, one or more mathematical operators may set one or more joints and/or rotation information for one or more tracked objects within the scene. This may result in a determination of local motion for one or more objects within their respective bounding boxes within the video (as opposed to the previously determined global motion for such objects).

Furthermore, in one embodiment, for each of one or more tracked objects, a three-dimensional (3D) object pose and shape sequence may be determined for the tracked object, utilizing the determined local motion for the tracked object within the video.

Further still, as shown in operation 108, motion infilling is performed for one or more of the tracked objects within the video. In one embodiment, one or more missing portions (e.g., missing information) may exist for one or more tracked objects within one or more frames of the video. For example, these missing portions may result from occlusion of the object in one or more frames. In another example, these missing portions may result from truncation of the object in one or more frames. In yet another example, these missing portions may result from the object moving out of the scene in one or more frames.

Also, in one embodiment, a trained neural network architecture may determine one or more missing portions for an object within a frame of the video. In another embodiment, if one or more missing portions are identified for an object within a bounding box of a predetermined frame of the video, previous pose and shape data may be identified for the object within previous bounding boxes of previous frames of the video (e.g., frames occurring before the predetermined frame, etc.).

Additionally, in one embodiment, the previous pose and shape data for the object may be input into a trained neural network architecture. In another embodiment, the trained neural network architecture may predict the pose and shape data for the object within the predetermined frame of the video. In yet another embodiment, the predicted pose and shape data may be used to fill in the missing portions of the object within the predetermined frame of the video. In still another embodiment, results of performing motion infilling may include infilled local motion for one or more objects within the video.

Further, as shown in operation 110, a global trajectory is predicted for one or more tracked objects within the video. In one embodiment, for each object within the video having infilled local motion, the infilled local motion may be used to predict a global trajectory for the object within the video. For example, the global trajectory may include a translation and orientation of the object within a global coordinate system. This may recover global orientation/translation for a tracked object (where such information was previously removed).

Further still, as shown in operation 112, for one or more tracked objects within the video, the infilled motion for the tracked object is combined with the global trajectory for the tracked object to determine the infilled global motion for the tracked object. In one embodiment, the infilled global motion may be determined with respect to a global coordinate system. In another embodiment, the infilled motion may include the results of performing motion infilling for the one or more tracked objects within the video.

Also, in one embodiment, one or more camera parameters (e.g., camera movement (position and orientation) during recording, etc.) may be accounted for during the determination of the infilled global motion. In another embodiment, for each of one or more tracked objects, the 3D object pose sequence for that tracked object may be refined utilizing the infilled global motion for the tracked object. In yet another embodiment, the global trajectory for the tracked object may be further refined to make it consistent with image evidence within the video. For example, the global trajectory may be refined using an optimization objective while also optimizing for extrinsic camera parameters within the video.

In this way, a 3D pose sequence may be determined for one or more objects within a video, where each 3D pose sequence has no missing portions. This may reduce an amount of processing necessary to implement these objects within one or more applications (e.g., virtual reality, animation, etc.). Additionally, the 3D representations of the one or more objects may be determined within a global coordinate system, which may also reduce an amount of processing necessary to implement these objects within such applications. This may improve a performance of computing hardware performing the applications.

Figure 2:
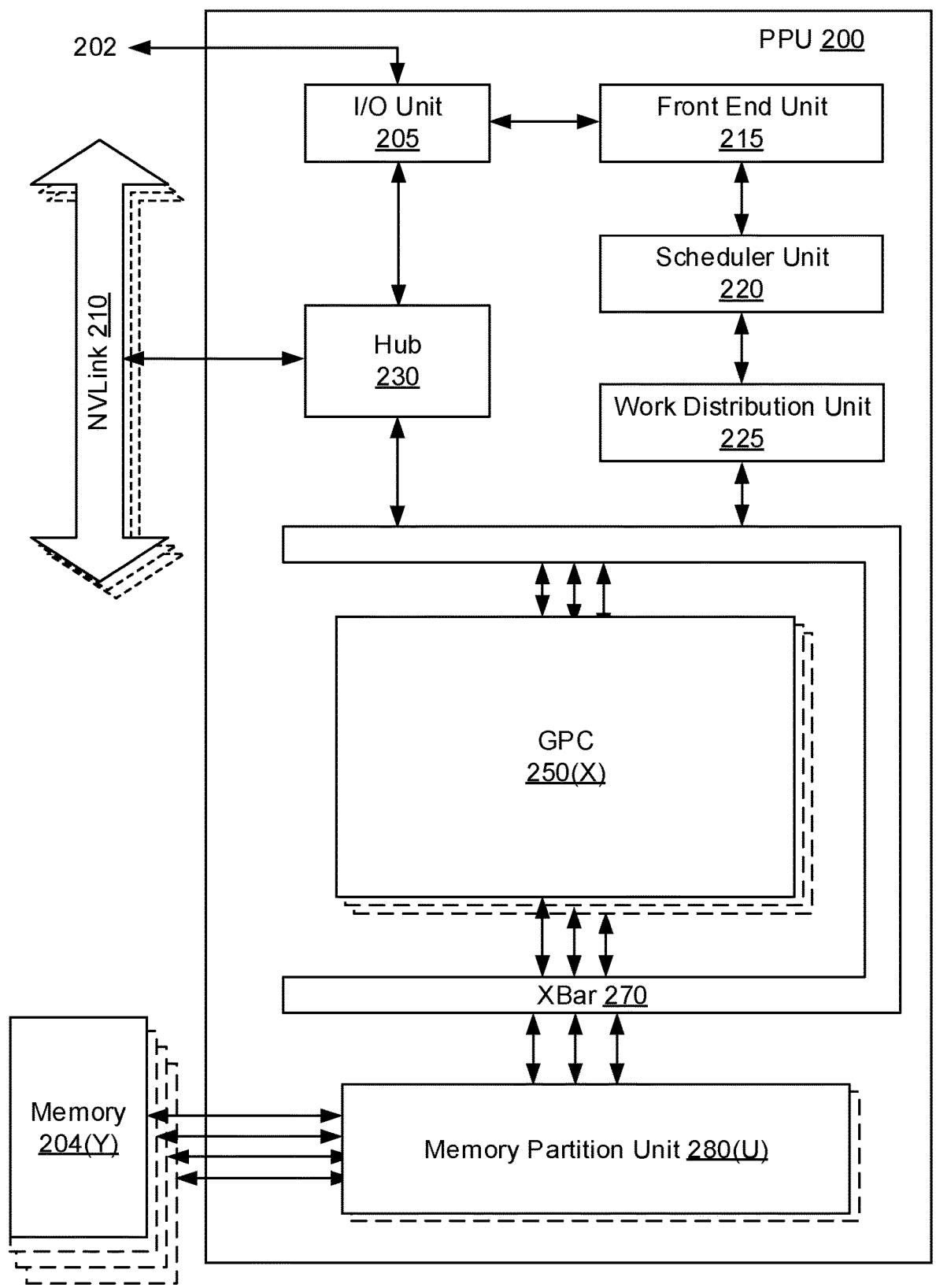
FIG. 2 illustrates a parallel processing unit, in accordance with an embodiment.

In yet another embodiment, the safety determination may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
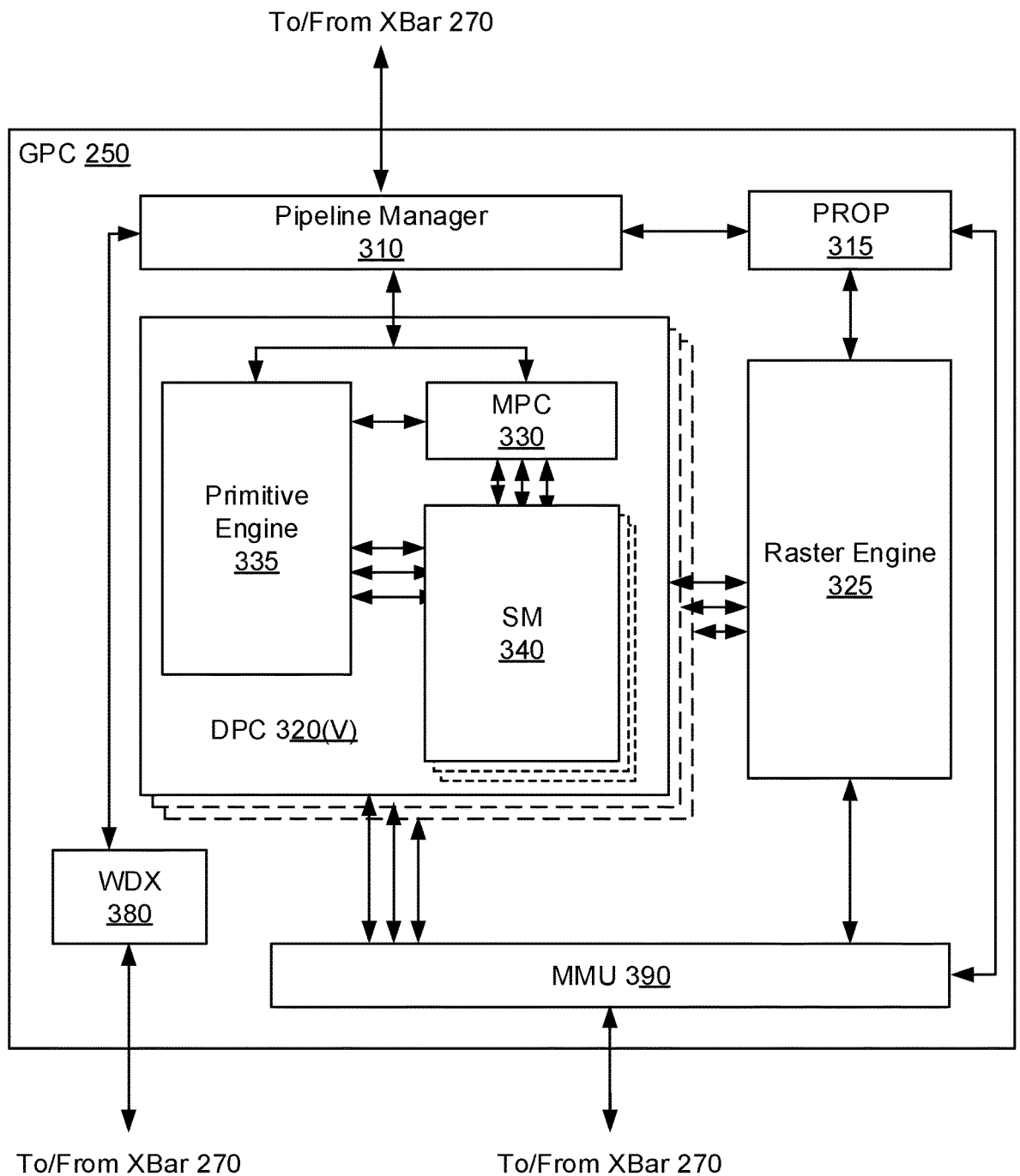
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
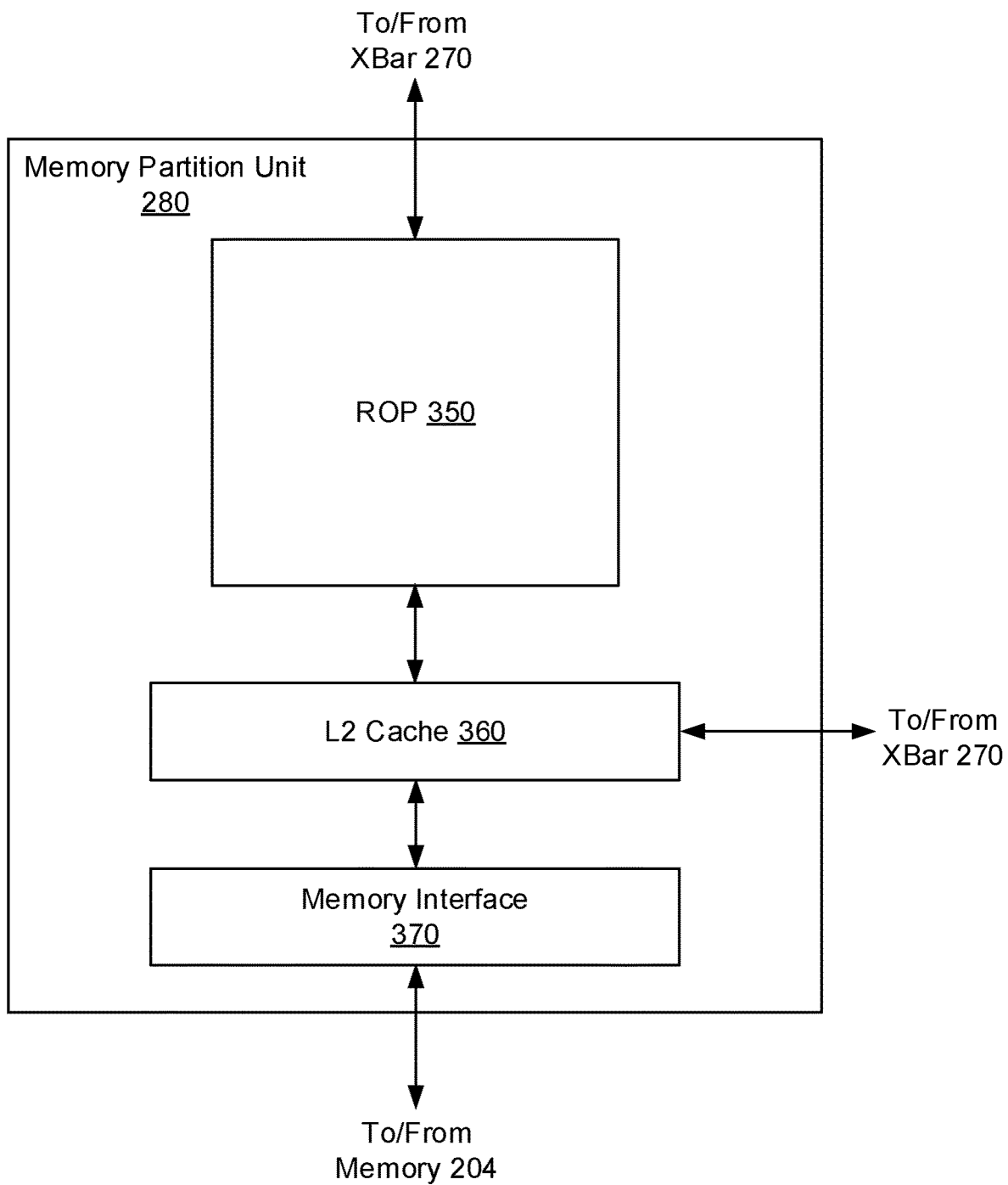
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiments, the ROP unit 350 may be outside of the memory partition unit 280. For example, the ROP unit 350 may reside in the GPC 250 or another unit.

Figure 4A:
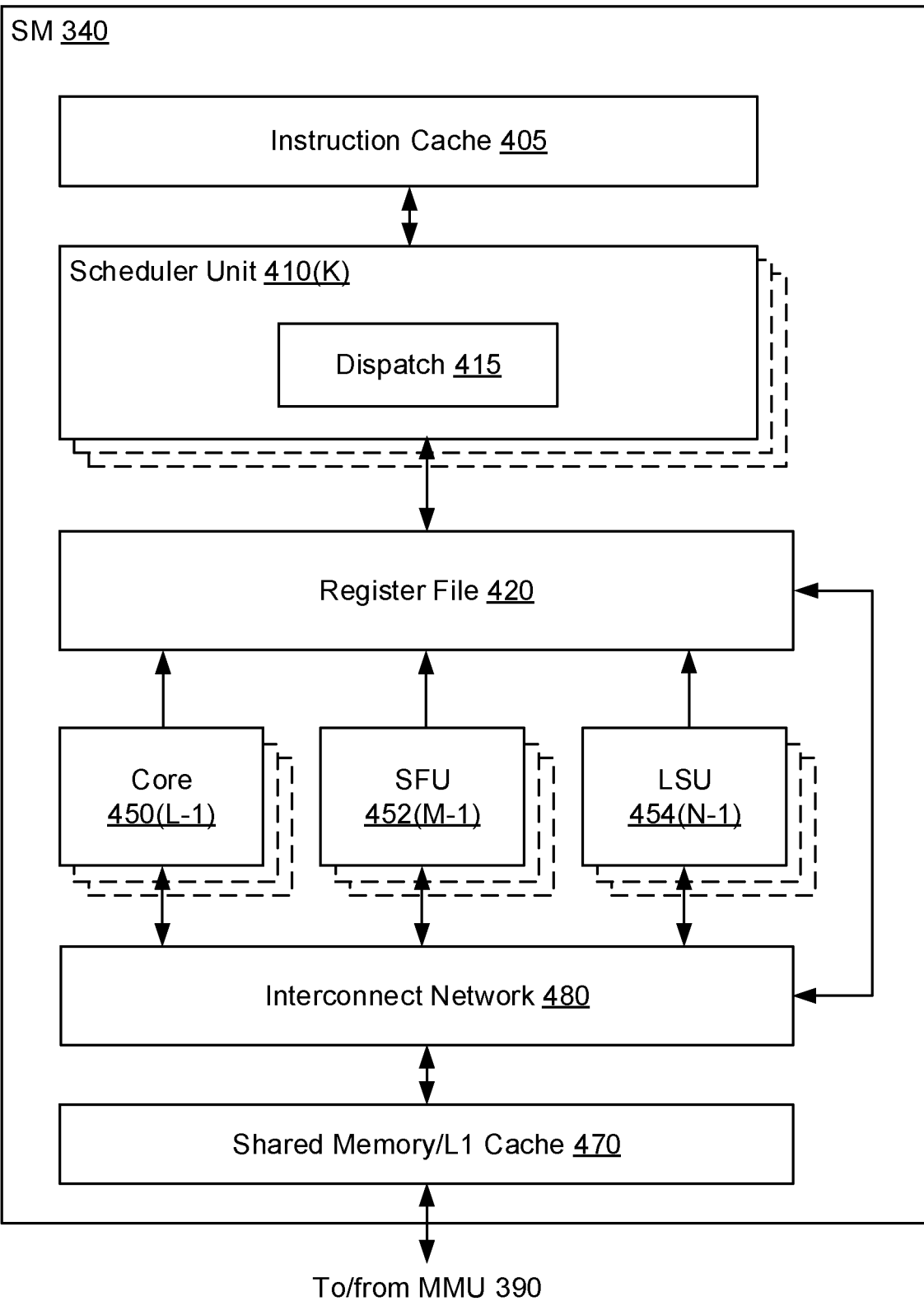
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
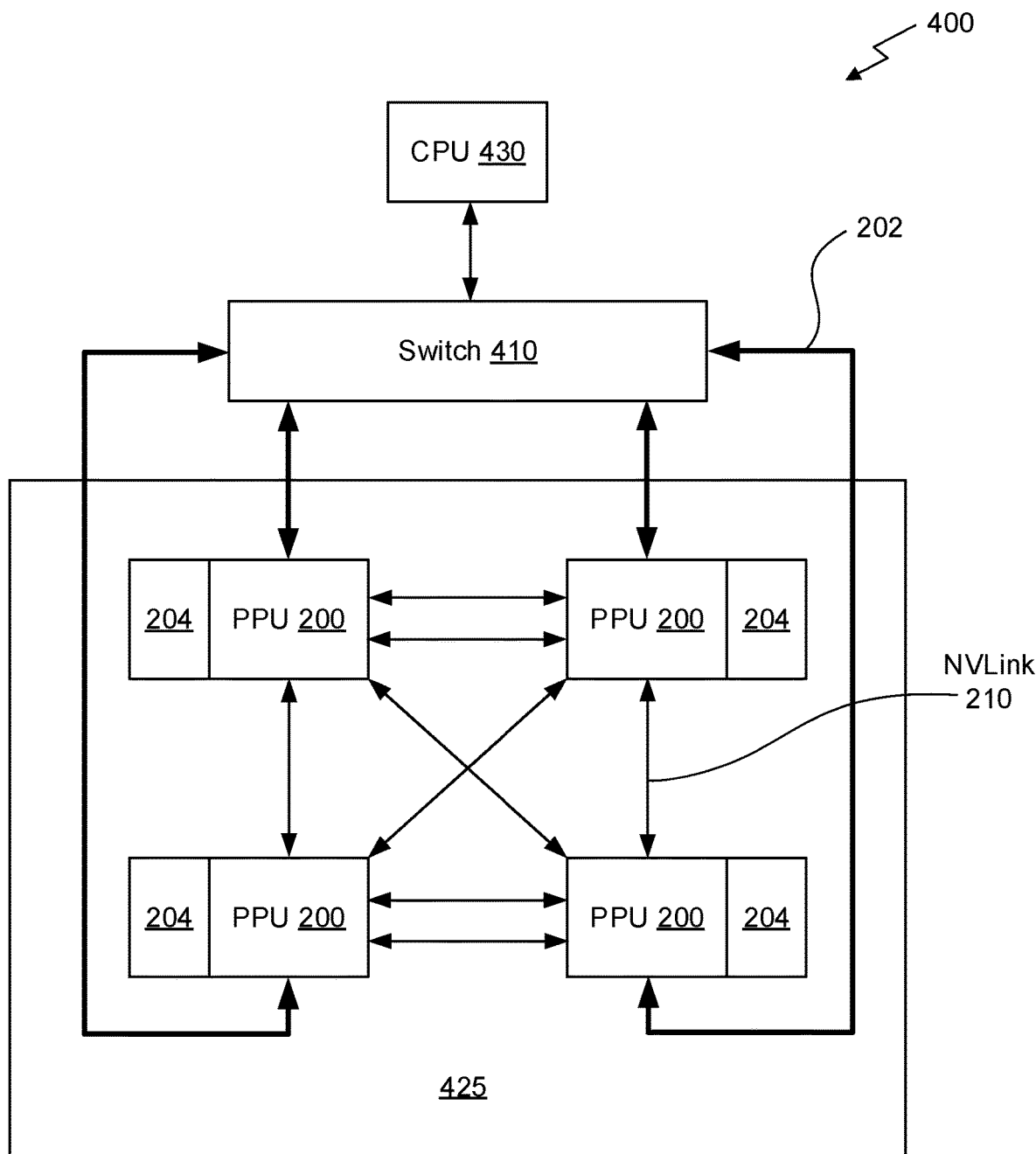
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
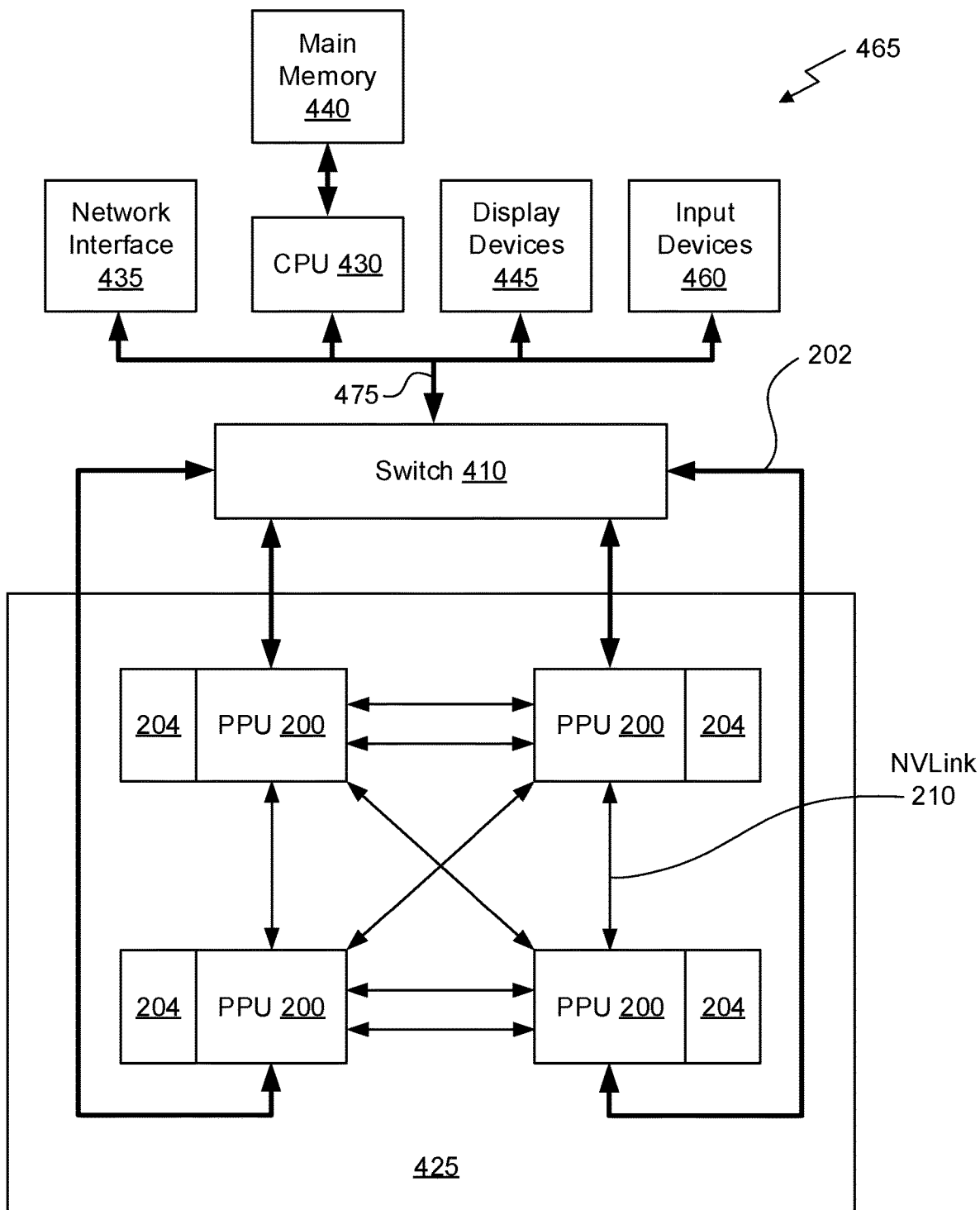
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Exemplary Environment

Figure 5:
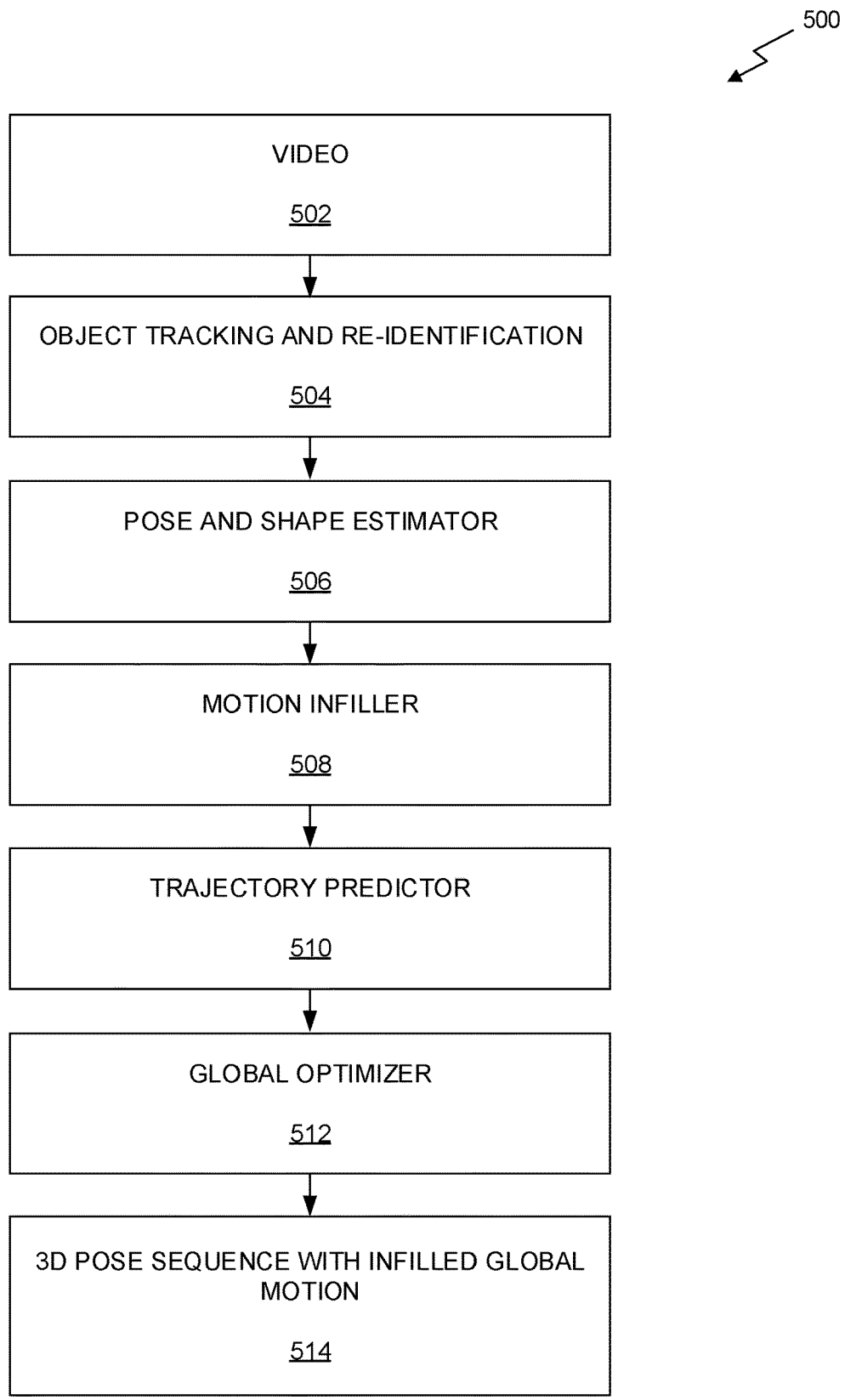
FIG. 5 illustrates an exemplary occlusion-aware global 3D object pose and shape estimation environment, in accordance with an embodiment.

FIG. 5 illustrates an exemplary occlusion-aware global 3D object pose and shape estimation environment 500, according to one exemplary embodiment. As shown, a video 502 is input into an object tracker and re-identifier 504, which places a bounding box around each object to be tracked within each frame of the video, assigns an identifier to each tracked object within the video, and re-identifies objects that are removed from one or more frames in the video and that re-appear in later frames of the video.

Additionally, results created by the object tracker and re-identifier 504 (e.g., video with bounding boxes around each identified object, and an identifier for each object) may be input into a pose and shape estimator 506. In one embodiment, the pose and shape estimator 506 may determine a pose and shape for each identified and tracked object within each frame of the video. In one embodiment, the pose and shape may be represented as a triangulated mesh.

Further, in one embodiment, within the pose and shape estimator 506, a translation and global orientation may be removed from each tracked object within the video. For example, within each frame of the video, a translation and global orientation may be removed from one or more objects within each bounding box. This may result in a determination of local motion for one or more objects within their respective bounding boxes within the video (as opposed to the previously determined global motion for such objects).

Further still, results created by the pose and shape estimator 506 (e.g., a determination of local motion for each object within its respective bounding box within the video) may be input into a motion infiller 508. In one embodiment, the motion infiller 508 may identify and fill in all missing portions for all tracked objects within the video, utilizing previous pose and shape data for the tracked objects as input into a trained neural network.

Also, results created by the motion infiller 508 (e.g., the infilled local motion for all objects within their respective bounding boxes within the video) may be input into a trajectory predictor 510. In one embodiment, for each object, the motion infiller 508 may use the infilled local motion for that object to predict a global trajectory (e.g., a 3D position and orientation with respect to a camera at each video frame) for the object within the video.

In addition, results created by the trajectory predictor 510 (e.g., a global trajectory for each object within their respective bounding box within the video) may be input into a global optimizer 512 along with the infilled local motion for all objects within their respective bounding boxes within the video. Utilizing these inputs, the global optimizer 512 may determine the infilled global motion for each object with respect to a global coordinate system, and may determine a three-dimensional (3D) pose sequence (e.g., a sequence of 3D meshes) 514 for each object utilizing the infilled global motion for such object within the video 502.

In this way, the occlusion-aware global 3D object pose estimation environment 500 may determine a 3D model and pose sequence for each object within a video, where each 3D model and pose sequence is represented within a global coordinate system and has no missing portions.

Global Occlusion-Aware Human Mesh Recovery with Dynamic Cameras

In one embodiment, an approach is provided for 3D global human mesh recovery from monocular videos recorded with dynamic cameras. This approach is robust to severe and long-term occlusions and tracks human bodies even when they go outside the camera's field of view. To achieve this, a deep generative motion infiller is provided which autoregressively infills the body motions of occluded humans based on visible motions. Additionally, in contrast to prior work, this approach reconstructs human meshes in consistent global coordinates even with dynamic cameras. Since the joint reconstruction of human motions and camera poses is underconstrained, a global trajectory predictor is provided that generates global human trajectories based on local body movements. Using the predicted trajectories as anchors, we present a global optimization framework that refines the predicted trajectories and optimizes the camera poses to match the video evidence such as 2D keypoints.

This task is highly challenging for two main reasons. First, dynamic cameras make it difficult to estimate human motions in consistent global coordinates. Existing human mesh recovery methods estimate human meshes in the camera coordinates or even in the root-relative coordinates. Hence, they can only recover global human meshes from dynamic cameras by using SLAM to estimate camera poses. However, SLAM can often fail for in-the-wild videos due to moving and dynamic objects. It also has the problem of scale ambiguity, which often leads to camera poses that are inconsistent with the human motions. Second, videos captured by dynamic cameras often contain severe and long-term occlusions of humans, which can be caused by missed detection, complete obstruction by objects and other people, or the person going outside the camera's field of view (FoV). These occlusions pose serious challenges to standard human mesh recovery methods, which rely on detections or visible parts to estimate human meshes. Existing methods can only address partial occlusions of a person and fail to handle severe occlusions when the person is completely invisible for an extended period of time.

To tackle the above challenges, Global Occlusion-Aware Human Mesh Recovery (GLAMR) is provided, which can handle severe occlusions and estimate human meshes in consistent global coordinates—even for videos recorded with dynamic cameras. First, an estimation is made of the shape and pose sequences (motions) of visible people in the camera coordinates. Multiobject tracking and re-identification provide occlusion information, and the motion of occluded frames is not estimated. To tackle potentially severe occlusions, a deep generative motion infiller is used that autoregressively infills the local body motions of occluded people based on visible motions. The motion infiller leverages human dynamics learned from a motion database. Next, to obtain global motions, a global trajectory predictor may be used that can generate global human trajectories based on local body motions. It is motivated by the observation that the global root trajectory of a person is highly correlated with the local body movements. Finally, using the predicted trajectories as anchors to constrain the solution space, a global optimization framework may jointly optimize the global motions and camera poses to match the video evidence such as 2D keypoints.

In this way, long-term occlusions are addressed and global 3D human pose and shape are estimated from videos captured by dynamic cameras. Additionally, a generative Transformer-based motion infiller autoregressively infills long-term missing motions. Further, a method is provided to generate global human trajectories from local body motions and use the generated trajectories as anchors to constrain global motion and camera optimization.

The input to the framework is a video $I=(I_1, \ldots, I_T)$ with T frames, which is captured by a dynamic camera, i.e., the camera poses can change every frame. Our goal is to estimate the global motion (pose sequence) $\{Q^i\}_{i=1}^N$ of the N people in the video in a consistent global coordinate system. The global motion $Q^i=(T^i, R^i, \Theta^i, B^i)$ for person i consists of the root translations $T^i=(\tau_{s_i}^i, \ldots, \tau_{e_i}^i)$, root rotations $R^i=(\gamma_{s_i}^i, \ldots, \gamma_{e_i}^i)$, as well as the body motion $\Theta^i=(\theta_{s_i}^i, \ldots, \theta_{e_i}^i)$ and shapes $B^i=(\beta_{s_i}^i, \ldots, \beta_{e_i}^i)$, where the motion spans from the first frame $s_i$ to the last frame $e_i$, when the person i is relevant in the video. In particular, each body pose $\theta_t^i \in \mathbb{R}^{23 \times 3}$ and shape $\beta_t^i \in \mathbb{R}^{10}$ corresponds to the pose parameters (joint rotations excluding the root rotation) and shape parameters of the SMPL model. Using the root translation $\tau \in \mathbb{R}^3$ and (axis-angle) rotation $\gamma \in \mathbb{R}^3$, SMPL represents a human body mesh with a linear function $S(\tau, \gamma, \theta, \beta)$ that maps a global pose $q=(\tau, \gamma, \theta, \beta)$ to an articulated triangulated mesh $\Phi \in \mathbb{R}^{K \times 3}$ with K=6980 vertices. The global mesh sequence for each person may be recovered from their global motion $Q^i$ via SMPL.

An exemplary framework consists of four stages. In Stage I, multi-object tracking (MOT) and re-identification algorithms are used to obtain the bounding box sequence of each person, which is input to a human mesh recovery method (e.g., KAMA or SPEC) to extract the motion $\tilde{Q}^i$ of each person (including translation) in the camera coordinates. The motion $\tilde{Q}^i$ may be incomplete due to various occlusions (e.g., obstruction, missed detection, going outside FoV), where bounding boxes from MOT are missing for some frames.

In Stage II, a generative motion infiller may address the occlusions in the estimated body motion $\tilde{\Theta}^i$ and produce occlusion-free body motion $\hat{\Theta}^i$. In Stage III, a global trajectory predictor uses the infilled body motion $\hat{\Theta}^i$ to generate the global trajectory (root translations and rotations) of each person and obtain their global motion $\hat{Q}^i$. In Stage IV, the global trajectories of all people and the camera parameters are jointly optimized to produce global motions $\breve{Q}^i$ consistent with the video evidence.

Generative Motion Infiller

The task of the generative motion infiller M is to infill the occluded body motion $\tilde{\Theta}^i$ of each person to produce occlusion-free body motion $\hat{\Theta}^i$. Here, the motion infiller M is not used to infill other components in the estimated motion $\tilde{Q}^i$, i.e., root trajectory $(\tilde{T}^i, \tilde{R}^i)$ and shapes $\tilde{B}^i$. This is because it is difficult to infill the root trajectory $(\tilde{T}^i, \tilde{R}^i)$ using learned human dynamics, since it resides in the camera coordinates rather than a consistent coordinate system due to the dynamic camera. In one embodiment, the proposed global trajectory predictor may be used to generate occlusion-free global trajectory $(\hat{T}^i, \hat{R}^i)$ from the infilled body motion $\hat{\Theta}^i$. The trajectory $(\tilde{T}^i, \tilde{R}^i)$ from the pose estimator is not discarded and will be used in the global optimization. For the shapes, linear interpolation may be used to produce occlusion-free shapes $\hat{B}^i$ since a person's shape should stay close to a constant throughout the video.

Given a general occluded human body motion $\tilde{\Theta}=(\tilde{\theta}_1, \ldots, \tilde{\theta}_h)$ of h frames and its visibility mask $V=(V_1, \ldots, V_h)$ as input, the motion infiller M outputs a complete occlusion-free motion $\hat{\Theta}=(\hat{\theta}_1, \ldots, \hat{\theta}_h)$. The visibility mask V encodes the visibility of the occluded motion $\tilde{\Theta}$, where $V_t=1$ if the body pose $\tilde{\theta}_t$ is visible in frame t and $V_t=0$ otherwise. Since the human pose for occluded frames can be highly uncertain and stochastic, the motion infiller M may be formulated using the conditional variational autoencoder (CVAE):

$$\hat{\Theta} = \mathcal{M}(\tilde{\Theta}, V, z), \quad (1)$$

where the motion infiller M corresponds to the CVAE decoder and z is a Gaussian latent code. Different occlusion-free motions $\hat{\Theta}$ may be obtained by varying z.

Autoregressive Motion Infilling

To ensure that the motion infiller M can handle much longer test motions than the training motions, an autoregressive motion infilling process may be used at test time. A sliding window of h frames may be used, it is assumed the first $h_c$ frames of motion are already occlusion-free or infilled and serve as context, and the last $h_l$ frames are used as look-ahead. The look-ahead is useful to the motion infiller since it may contain visible poses that can guide the ending motion and avoid generating discontinuous motions. Excluding the context and look-ahead frames, only the middle $h_o=h-h_c-h_l$ frames of motion are infilled. The motion is iteratively infilled using the sliding window and the window is advanced by $h_o$ frames every step.

Motion Infiller Network

The overall network design of the CVAE-based motion infiller employs a Transformer-based seq2seq architecture, which consists of three parts: (1) a context network that uses a Transformer encoder to encode the visible poses from the occluded motion $\tilde{\Theta}$ into a context sequence, which serves as the condition for other networks; (2) a decoder network that uses the latent code z and context sequence to generate occlusion-free motion $\hat{\Theta}$ via a Transformer decoder and a multilayer perceptron (MLP); and (3) prior and posterior networks that generate the prior and posterior distributions for the latent code z.

In the transformer-based networks, a time-based encoding replaces the position in the original positional encoding with the time index. Unlike prior CNN-based methods the Transformer-based motion infiller does not require padding missing frames, but instead restricts its attention to visible frames to achieve effective temporal modeling.

Training

The motion infiller M is trained using a large motion capture dataset (e.g., AMASS, etc.). To synthesize occluded motions $\tilde{\Theta}$, for any GT training motion $\Theta^t$ of h frames, $H_{occ}$ consecutive frames of motion are randomly occluded where $H_{occ}$ is uniformly sampled from $[H_{lb}, H_{ub}]$. Note that the first $h_c$ frames are not occluded and are reserved as context. A standard CVAE objective may be used to train the motion infiller M:

$$L_M = \sum_{t=1}^{h} \|\hat{\theta}_t - \theta'_t\|_2^2 + L_{KL}^z, \quad (2)$$

where $L_{KL}^z$ is the KL divergence between the prior and posterior distributions of the CVAE latent code z.

Global Trajectory Predictor

After occlusion-free body motion $\hat{\Theta}^i$ is obtained for each person using the motion infiller, a key issue still remains: the estimated trajectory $(\tilde{T}^i, \tilde{R}^i)$ of the person is still occluded and not in a consistent global coordinate system. To tackle this problem, a global trajectory predictor T may be learned that generates a person's occlusion-free global trajectory $(\hat{T}^i, \hat{R}^i)$ from the local body motion $\hat{\Theta}^i$.

Given a general occlusion-free body motion $\Theta=(\theta_1, \ldots, \theta_m)$ as input, the trajectory predictor T outputs its corresponding global trajectory (T, R) including the root translations $T=(\tau_1, \ldots, \tau_m)$ and rotations $R=(\gamma_1, \ldots, \gamma_m)$. To address any potential ambiguity in the global trajectory, the global trajectory predictor is also formulated using the CVAE:

$$\Psi = \mathcal{T}(\Theta, v), \quad (3)$$

$$(T, R) = \text{EgoToGlobal}(\Psi), \quad (4)$$

where the global trajectory predictor T corresponds to the CVAE decoder and v is the latent code for the CVAE. In equation (3), the immediate output of the global trajectory predictor T is an egocentric trajectory $\Psi=(\psi_1, \ldots, \psi_m)$, which by design can be converted to a global trajectory (T, R) using a conversion function EgoToGlobal.

Egocentric Trajectory Representation

The egocentric trajectory $\Psi$ is just an alternative representation of the global trajectory (T, R). It converts the global trajectory into relative local differences and represents rotations and translations in the heading coordinates (y-axis aligned with the heading, i.e., the person's facing direction). In this way, the egocentric trajectory representation is invariant of the absolute xy translation and heading. It is more suitable for the prediction of long trajectories, since the network only needs to output the local trajectory change of every frame instead of the potentially large global trajectory offset.

The conversion from the global trajectory to the egocentric trajectory is given by another function: $\Psi=\text{GlobalToEgo}(T, R)$, which is the inverse of the function EgoToGlobal. In particular, the egocentric trajectory $\psi_t=(\delta x_t, \delta y_t, z_t, \delta\phi_t, \eta_t)$ at time t is computed as:

$$(\delta x_t, \delta y_t) = \text{ToHeading}(\tau_t^{xy} - \tau_{t-1}^{xy}), \quad (5)$$

$$z_t = \tau_t^z, \quad \delta\phi_t = \gamma_t^\phi - \gamma_{t-1}^\phi, \quad (6)$$

$$\eta_t = \text{ToHeading}(\gamma_t), \quad (7)$$

where $\tau_t^{xy}$ is the xy component of the translation $\tau_t$, $\tau_t^z$ is the z component (height) of $\tau_t$, $\gamma_t^\phi$ is the heading angle of the rotation $\gamma_t$, and ToHeading is a function that converts translations or rotations to the heading coordinates defined by the heading $\gamma_t^\phi$. As an exception, $(\delta x_0, \delta y_0)$ and $\delta\phi_0$ are used to store the initial xy translation $\tau_0^{xy}$ and heading $\tau_0^\phi$.

These initial values are set to the GT during training and arbitrary values during inference (as the trajectory can start from any position and heading). The inverse process of equations (5)-(7) defines the inverse conversion EgoToGlobal used in equation (4), which accumulates the egocentric trajectory of each frame to obtain the global trajectory. To correct potential drifts in the trajectory, the global trajectory of each person may be optimized to match the video evidence, which also solves the trajectory's initial position and heading $(\delta x_0, \delta y_0, \delta\phi_0)$.

Network and Training

The trajectory predictor adopts a similar network design as the motion infiller with one main difference: LSTMs may be used for temporal modeling instead of Transformers since the output of each frame is the local trajectory change in the egocentric trajectory representation, which mainly depends on the body motion of nearby frames and does not require long-range temporal modeling. The egocentric trajectory and use of LSTMs instead of Transformers are beneficial for accurate trajectory prediction. A CVAE objective may be used to train the trajectory predictor T:

$$L_{\mathcal{T}} = \sum_{t=1}^{m}(\|\tau_t - \tau'_t\|_2^2 + \|\gamma_t \ominus \gamma'_t\|_a^2) + L_{KL}^v, \quad (8)$$

where $\tau'_t$ and $\gamma'_t$ denote the GT translation and rotation, $\ominus$ computes the relative rotation, $\|\cdot\|_a$ computes the rotation angle, and $L_{KL}^v$ is the KL divergence between the prior and posterior distributions of the CVAE latent code v. AMASS may be used to train the trajectory predictor T.

Global Optimization

After using the generative motion infiller and global trajectory predictor, an occlusion-free global motion $\hat{Q}^i = (\hat{T}^i, \hat{R}^i, \hat{\Theta}^i, \hat{B}^i)$ is obtained for each person in the video. However, the global trajectory predictor generates trajectories for each person independently, which may not be consistent with the video evidence. To address this, a global optimization process jointly optimizes the global trajectories of all people and the extrinsic camera parameters to match the video evidence such as 2D keypoints. The final output of the global optimization and the framework is $\check{Q}^i = (\check{T}^i, \check{R}^i, \check{\Theta}^i, \check{B}^i)$, where $(\check{\Theta}^i, \check{B}^i) = (\hat{\Theta}^i, \hat{B}^i)$, i.e., the occlusion-free body motion and shapes are directly used from the previous stages.

Optimization Variables

The first set of variables to be optimized is the egocentric representation $\{\check{\Psi}^i\}_{i=1}^N$ of the global trajectories $\{(\check{T}^i, \check{R}^i)\}_{i=1}^N$. The egocentric representation is used since it allows corrections of the translation and heading at one frame to propagate to all future frames. The second set of optimization variables is the extrinsic camera parameters $C = (C_1, \ldots, C_T)$ where $C_t \in \mathbb{R}^{4\times 4}$ is the camera extrinsic matrix at frame t of the video.

Energy Function

The energy function we aim to minimize is defined as $$E(\{\check{\Psi}^i\}_{i=1}^N, C) = \lambda_{2D}E_{2D} + \lambda_{traj}E_{traj} + \lambda_{reg}E_{reg} + \lambda_{cam}E_{cam} + \lambda_{pen}E_{pen}, \quad (9)$$

where five energy terms are used with their corresponding coefficients $\lambda_{2D}, \lambda_{traj}, \lambda_{reg}, \lambda_{cam},$ and $\lambda_{pen}$. The first term $E_{2D}$ measures the error between the 2D projection $\check{x}_t^i$ of the optimized 3D keypoints $\check{X}_t^i \in \mathbb{R}^{J\times 3}$ and the estimated 2D keypoints $\tilde{x}_t^i$ from a keypoint detector:

$$E_{2D} = \frac{1}{NTJ}\sum_{i=1}^{N}\sum_{t=1}^{T} V_t^i \|\check{x}_t^i - \tilde{x}_t^i\|_F^2, \quad (10)$$

$$\check{x}_t^i = \Pi(\check{X}_t^i, C_t, K), \quad \check{X}_t^i = \mathcal{J}(\check{\tau}_t^i, \check{\gamma}_t^i, \check{\theta}_t^i, \check{\beta}_t^i), \quad (11)$$

where $V_t^i$ is person i's visibility at frame t, $\Pi$ is the camera projection with extrinsics $C_t$ and approximated intrinsics K, and $\check{X}_t^i$ is computed using the SMPL's joint regressor $\mathcal{J}$ from the optimized global pose $\check{q}_t^i = (\check{\tau}_t^i, \check{\gamma}_t^i, \check{\theta}_t^i, \check{\beta}_t^i) \in \check{Q}^i$. The second term $E_{traj}$ measures the difference between the optimized global trajectory $(\check{T}^i, \check{R}^i)$ viewed in the camera coordinates and the trajectory $(\tilde{T}^i, \tilde{R}^i)$ output by the pose estimator (e.g., KAMA) in Stage I:

$$E_{traj} = \frac{1}{NT}\sum_{i=1}^{N}\sum_{t=1}^{T} V_t^i(\|\Gamma(\check{\gamma}_t^i, C_t) \ominus \tilde{\gamma}_t^i\|_a^2 + w_t\|\Gamma(\check{\tau}_t^i, C_t) - \tilde{\tau}_t^i\|_2^2), \quad (12)$$

where the function $\Gamma(\cdot, C_t)$ transforms the global rotation $\check{\gamma}_t^i$ or translation $\check{\tau}_t^i$ to the camera coordinates defined by $C_t$, and $w_t$ is a weighting factor for the translation term.

The third term $E_{reg}$ regularizes the egocentric trajectory $\check{\Psi}^i$ to stay close to the output $\hat{\Psi}^i$ of the trajectory predictor:

$$E_{reg} = \frac{1}{NT}\sum_{i=1}^{N}\sum_{t=1}^{T} \|w_\psi \circ (\check{\psi}_t^i - \hat{\psi}_t^i)\|_2^2, \quad (13)$$

where $\circ$ denotes the element-wise product and $w_\psi$ is a weighting vector for each element inside the egocentric trajectory. As an exception, each person's initial xy position and heading $(\delta\check{x}_0^i, \delta\check{y}_0^i, \delta\check{\phi}_0^i) \subset \check{\psi}_0^i$ are not regularized as they need to be inferred from the video.

The fourth term $E_{cam}$ measures the smoothness of the camera parameters C and the uprightness of the camera:

$$E_{cam} = \frac{1}{T}\sum_{t=1}^{T}\langle C_t^y, Y\rangle + \frac{1}{T-1}\sum_{t=1}^{T-1}\|C_{t+1}^\gamma \ominus C_t^\gamma\|_a^2 + \|C_{t+1}^\tau - C_t^\tau\|_2^2, \quad (14)$$

Where $\langle \cdot, \cdot \rangle$ denotes the inner product, $C_t^y$ is the +y vector of the camera $C_t$, and Y is the global up direction. $C_t^\gamma$ and $C_t^\tau$ denote the rotation and translation of the camera $C_t$.

The final term $E_{pen}$ is a signed distance field (SDF)-based inter-person penetration loss.

An approach is provided to recover 3D human meshes in consistent global coordinates from videos captured by a dynamic camera. To achieve this, a novel Transformer-based generative motion infiller addresses severe occlusions that often come with dynamic cameras. To resolve ambiguity in the joint reconstruction of global human motions and camera poses, global human trajectories are predicted from their local body motions. Finally, a global optimization framework refines the predicted trajectories and uses them as anchors for camera optimization.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
performing motion infilling for one or more tracked objects within a video, wherein a translation and global orientation are removed from the one or more tracked objects within the video prior to performing the motion infilling;
predicting a global trajectory for each of the one or more tracked objects within the video; and
for the one or more tracked objects within the video, combining the infilled motion for the tracked object with the global trajectory for the tracked object to determine infilled global motion for the tracked object.

2. The method of claim 1, wherein the video is monocular.

3. The method of claim 1, wherein the one or more tracked objects each have one or more missing portions resulting from occlusion of the tracked objects in one or more frames of the video.

4. The method of claim 1, wherein the one or more tracked objects each have one or more missing portions resulting from truncation of the tracked objects in one or more frames of the video.

5. The method of claim 1, wherein the one or more tracked objects each have one or more missing portions resulting from the object moving out of a scene in one or more frames of the video.

6. The method of claim 1, wherein in response to identifying one or more missing portions for one of the tracked objects within a predetermined frame of the video, previous pose and shape data for the tracked object is identified within previous frames of the video.

7. The method of claim 6, wherein the previous pose and shape data for the tracked object is input into a trained neural network architecture, where the trained neural network architecture predicts pose and shape data for the object within the predetermined frame of the video, and uses the predicted pose and shape data to fill in the missing portions for the tracked object within the predetermined frame of the video.

8. The method of claim 1, wherein after the motion infilling is performed for each of the one or more tracked objects within the video, the global trajectory is predicted for each of the one or more tracked object, using infilled local motion for each of the one or more tracked objects.

9. The method of claim 1, wherein the infilled global motion is determined with respect to a global coordinate system.

10. The method of claim 1, wherein one or more camera parameters are accounted for during the determination of the infilled global motion.

11. A system comprising:
a hardware processor of a device that is configured to:
perform motion infilling for one or more tracked objects within a video, wherein a translation and global orientation are removed from the one or more tracked objects within the video prior to performing the motion infilling;
predict a global trajectory for each of the one or more tracked objects within the video; and
for the one or more tracked objects within the video, combine the infilled motion for the tracked object with the global trajectory for the tracked object to determine infilled global motion for the tracked object.

12. The system of claim 11, wherein the video is monocular.

13. The system of claim 11, wherein the one or more tracked objects each have one or more missing portions resulting from occlusion of the tracked objects in one or more frames of the video.

14. The system of claim 11, wherein the one or more tracked objects each have one or more missing portions resulting from truncation of the tracked objects in one or more frames of the video.

15. The system of claim 11, wherein the one or more tracked objects each have one or more missing portions resulting from the object moving out of a scene in one or more frames of the video.

16. The system of claim 11, wherein in response to identifying one or more missing portions for one of the tracked objects within a predetermined frame of the video, previous pose and shape data for the tracked object is identified within previous frames of the video.

17. The system of claim 16, wherein the previous pose and shape data for the tracked object is input into a trained neural network architecture, where the trained neural network architecture predicts pose and shape data for the object within the predetermined frame of the video, and uses the predicted pose and shape data to fill in the missing portions for the tracked object within the predetermined frame of the video.

18. A non-transitory computer-readable storage medium storing instructions that, when executed by a processor of a device, causes the processor to cause the device to:
perform motion infilling for one or more tracked objects within a video, wherein a translation and global orientation are removed from the one or more tracked objects within the video prior to performing the motion infilling;
predict a global trajectory for each of the one or more tracked objects within the video; and
for the one or more tracked objects within the video, combine the infilled motion for the tracked object with the global trajectory for the tracked object to determine infilled global motion for the tracked object.

19. The computer-readable storage medium of claim 18, wherein:
- in response to identifying one or more missing portions for one of the tracked objects within a predetermined frame of the video, previous pose and shape data for the tracked object is identified within previous frames of the video, and
- the previous pose and shape data for the tracked object is input into a trained neural network architecture, where the trained neural network architecture predicts pose and shape data for the object within the predetermined frame of the video, and uses the predicted pose and shape data to fill in the missing portions for the tracked object within the predetermined frame of the video.

\* \* \* \* \*